Figure 1:
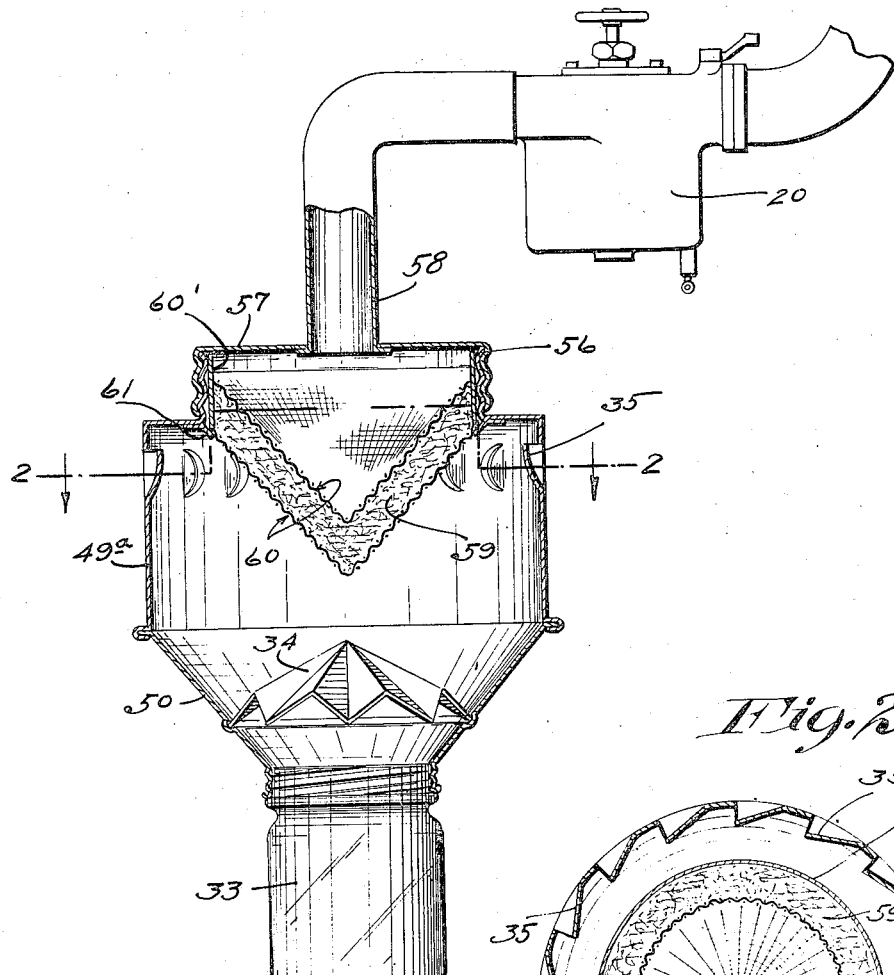

Oct. 28, 1924.

F. A. DONALDSON

AIR CLEANER

Original Filed Nov. 12, 1921

1,513,035

Inventor
Frank A. Donaldson
By his Attorneys

Patented Oct. 28, 1924.

1,513,035

UNITED STATES PATENT OFFICE.

FRANK A. DONALDSON, OF MINNEAPOLIS, MINNESOTA.

AIR CLEANER.

Original application filed November 12, 1921, Serial No. 514,628. Divided and this application filed August 31, 1923. Serial No. 660,411.

*To all whom it may concern:*

Be it known that I, FRANK A. DONALDSON, a citizen of the United States, residing at Minneapolis, in the county of Hennepin and State of Minnesota, have invented certain new and useful Improvements in Air Cleaners; and I do hereby declare the following to be a full, clear, and exact description of the invention, such as will enable others skilled in the art to which it appertains to make and use the same.

My present invention relates to air cleaners for use in connection with carburetors of internal combustion engines and the present application is filed as a division of my pending application Serial No. 514,628, filed of date November 12, 1921.

Generally stated, the invention consists of the novel construction, combinations and arrangement of parts hereinafter described and defined in the claims.

This invention combines the principles of the cyclone dust collector with a hollow filter, that is, a filter that has an external and internal surface, and provides an arrangement in which the air, entering the dust collector, is caused to take up a whirling motion immediately around and in contact with the filter. This novel relative arrangement accomplishes highly important results, as will hereinafter more fully appear.

In the accompanying drawings, which illustrate the invention, like characters indicate like parts throughout the several views.

Figure 2:
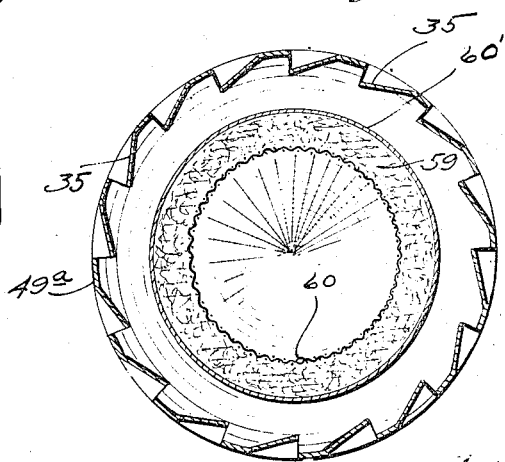

Referring to the drawings:

Fig. 1 is a vertical axial section illustrating one form of my improved air cleaner and showing the same connected to the intake of the carbureter of an internal combustion engine; and Fig. 2 is a horizontal section taken on the line 2—2 of Fig. 1.

In the following detail description, the parts of the carburetor are indicated by the same numerals or characters that were applied thereto in the original application above identified and of which the present application is a division.

The main or body member of the air cleaner, as shown, is in the form of a cylindrical shell 49ª that is provided with air intake ports 35, hopper bottom 50, baffle plate 34, and jar or dust receptacle 33. The circumferentially spaced air intake ports 35 are formed by inwardly pressed lips that incline circumferentially in a common direction, so that they cause the air, introduced into the shell, to immediately take up a whirling motion. The baffle plate 34 is a sort of a many-sided pyramid, the rim of which contacts with the hopper bottom 50 only at certain points, so that the precipitated dust can slide freely on the hopper bottom into the dust receptacle or jar 33.

The shell 49ª is shown as provided with an annular top plate formed with a large threaded neck or sleeve 56 that adapts it to be detachably connected to the depending threaded annular flange of a cap 57, which latter has an air discharge or delivery tube or pipe 58. This air discharge tube 58 is connected to the intake of a carburetor 20, such as generally used in connection with internal combustion engines. The hollow filter shown is of inverted conical form and preferably comprises a filtered fibrous body 59 impregnated with oil and contained between inner and outer woven wire cones 60, secured to a sheet metal collar 60'. This filter is detachably supported on an annular flange 61 secured to the top of the shell 49ª and adapted, when said shell is unscrewed from the relatively fixed cap 57, to be readily lifted from position, cleaned, and returned to position.

In the construction just described and illustrated, it is important to note that the filter itself projects below the air intake ports 35, or, in other words and more broadly stated, is surrounded by the said air intake ports, so that the air will begin its whirling movement within the shell 49 immediately around and more or less in contact with the lower or adjacent surface of the filter.

With this arrangement, as the air whirls within the casing, the greater part of the dust will, by the action of centrifugal force and gravity, be directly precipitated into the dust receptacle 33. Some of the dust, however, will be drawn against the filter, but the whirling or spiral downward movement of the air over the surface of the filter will, as is evident, gradually work downward some of the dust which is thrown against the filter, and will tend to work the dust downward to the inverted apex of the filter to the axis of the casing where centrifugal force becomes practically nil and where gravity will then precipitate dust from the filter onto the upturned apex of the baffle plate 34. Of course, dust falling onto the baffle plate will readily find its way into the jar or dust receptacle. Some of the dust which strikes the filter will be held thereby, so that, in the course of time, the filter should be removed, cleaned, and replaced in position. It will thus be seen that the whirling air in the casing has, to a considerable extent, a self-cleaning action of the filter.

From the statements made, it will, of course, be understood that the invention herein disclosed is capable of various modifications as to form and relative arrangement, all within the scope of the claims.

What I claim is:

1. An air cleaner comprising an outer casing having peripheral tangential air intake means and an axial air-outlet passage, a hollow filter inserted into said casing with its interior connected to said discharge passage and with its exterior directly exposed substantially in line with the axis of said intake to the air drawn into the casing through said air intake means.

2. An air cleaner comprising a shell and within the shell a dust filter, said shell having on one side of said filter an air-outlet passage adapted to be connected to the intake of a carburetor and provided on the other side of said filter with peripheral tangential inlet means directly adjacent to the side wall of the filter, the said filter being insertable and removable through the top of said shell, said filter having its exterior directly exposed substantially in line with the axis of said intake.

3. The structure defined in claim 2 in which said air inlet means is arranged to set up a whirling motion of the air directly adjacent to and against the side wall of said filter.

4. An air cleaner comprising a shell and within the shell a dust filter, said shell having on one side of said filter an air-outlet passage adapted to be connected to the intake of a carburetor and provided on the other side of said filter with peripheral tangential inlet means directly adjacent to the side wall of the filter, the said filter being insertable into and removable from said shell, in the path of the entering air, said filter having its exterior directly exposed substantially in line with the axis of said intake.

5. An air cleaner comprising an outer casing having peripheral tangential air intake means and an axial air outlet passage, a filter inserted into said casing with one surface thereof connected to said discharge passage and with its other surface directly exposed substantially in line with the axis of said intake, to the air drawn into the casing through said air intake means.

In testimony whereof I affix my signature.

FRANK A. DONALDSON.